No. 684,637. Patented Oct. 15, 1901.
J. GUIMARÃES.
GAS LAMP.
(Application filed Nov. 24, 1900.)
(No Model.)

WITNESSES:
George D. Grubel
Henry Suhrbier

INVENTOR
Julio Guimarães
BY
ATTORNEYS.

THE NORRIS PETERS CO., PHOTO-LITHO., WASHINGTON, D. C.

UNITED STATES PATENT OFFICE.

JULIO GUIMARÃES, OF BERLIN, GERMANY.

GAS-LAMP.

SPECIFICATION forming part of Letters Patent No. 684,637, dated October 15, 1901.

Application filed November 24, 1900. Serial No. 37,602. (No model.)

*To all whom it may concern:*

Be it known that I, JULIO GUIMARÃES, a citizen of Argentina, and a resident of West Bayreutherstrasse 44, Berlin, Germany, have invented certain new and useful Improvements in Gas-Lamps; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a gas-lamp in which an intensely white illuminating-flame is obtained by means of a strong current of air without the use of an incandescent mantle.

The invention consists of a gas-lamp in which a considerable quantity of oxygen is supplied in four air-currents to a flame kept steady by means of a chimney suspended in a globe, so as to produce a strong white light.

Figure 1:
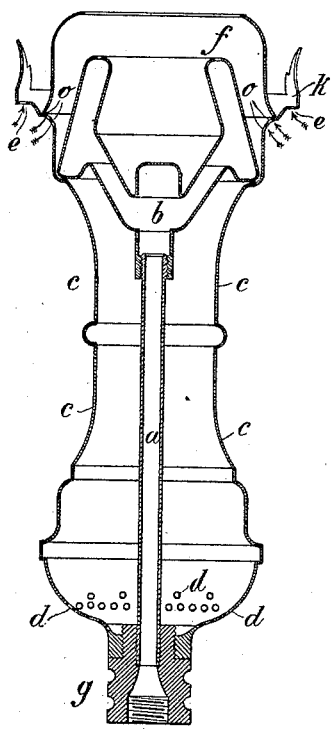
Figure 2:
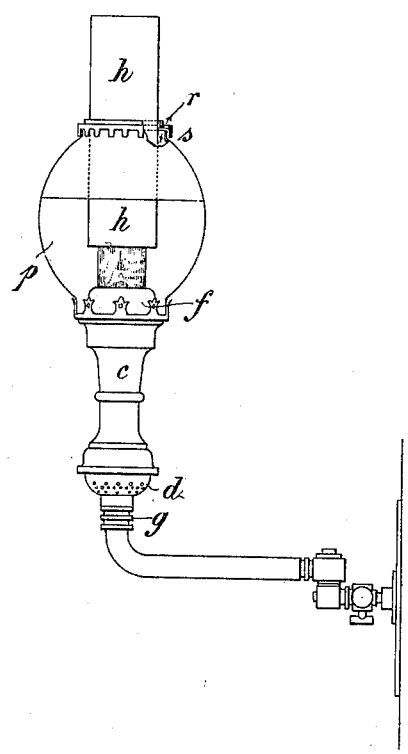
Figure 3:
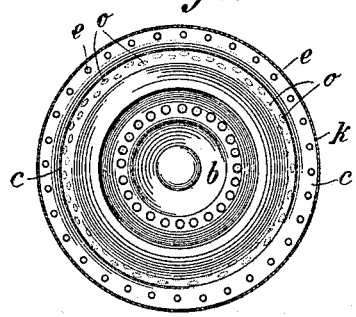

Figure 1 of the accompanying drawings is a vertical section of a burner constructed according to this invention. Fig. 2 is a side elevation of a gas-bracket provided with the lamp, and Fig. 3 is a plan of the burner shown in Fig. 1.

Similar letters of reference indicate corresponding parts.

The lamp is attached to an ordinary gas-pipe by means of a nipple *g* and comprises an outer casing *c*, provided at its lower end with air-inlets *d* and terminating at its upper end in a gallery *k*, beneath which two series of air-inlet openings *e* and *o* are provided. A gas-pipe *a* rises in the interior of the casing *c* and terminates in an annular burner *b*, which is surrounded by a cap *f*, that serves the important purpose of supplying air to the burner and of covering the lower blue portion of the flame. A chimney *h*, Fig. 2, is located above the flame and is connected to a globe *p* on the gallery *k* by means of a ring *s*, provided with air-inlet openings *r*.

The mode of operation of the lamp is as follows: The gas flows through the nipple *g*, the pipe *a*, and the burner *b* to the flame. In consequence of the arrangement of the chimney *h* a steady flame is obtained which is well supplied with oxygen by means of four currents of air flowing through the openings *d*, *e*, *o*, and *r*, respectively. In contradistinction to a Bunsen burner there is therefore in this case no mixing of the air with the gas before combustion, but air is supplied to the flame only at and above the place where the gas issues from the burner. An intensely white illuminating-flame like the incandescent light is thus obtained without the use of an incandescent mantle.

Having thus described my invention, what I claim as new therein, and desire to secure by Letters Patent of the United States of America, is—

In a gas-lamp, the combination of a casing provided with air-inlet openings at its lower end, a gallery supported on said casing, a burner in said casing, a cap supported on said casing, and adapted to cover the lower blue portion of the flame from said burner, said casing being provided with openings below the cap, a globe supported on the gallery, said gallery having perforations for admitting air into the globe above the cap, a chimney, and a ring secured to said chimney, and resting upon said globe, the lower end of said chimney being located above said cap, and said ring being provided with perforations for admitting air into the top of the globe, substantially as set forth.

In testimony that I claim the foregoing as my invention I have signed my name in presence of two subscribing witnesses.

JULIO GUIMARÃES.

Witnesses:
 HENRY HASPER,
 WOLDEMAR HAUPT.